United States Patent
Rabeela et al.

(10) Patent No.: US 9,197,596 B2
(45) Date of Patent: Nov. 24, 2015

(54) SYSTEM AND METHOD TO USE COMMON ADDRESSES ON A MANAGEMENT CONTROLLER WITHOUT CONFLICT

(71) Applicant: Dell Products, LP, Round Rock, TX (US)

(72) Inventors: Janorious Rabeela, Bangalore (IN); Elie A. Jreij, Plugerville, TX (US); Akkiah C. Maddukuri, Austin, TX (US); Neti Swathiprasad, Bangalore (IN)

(73) Assignee: Dell Products, LP, Round Rock, TX (US)

( * ) Notice: Subject to any disclaimer, the term of this patent is extended or adjusted under 35 U.S.C. 154(b) by 339 days.

(21) Appl. No.: 13/718,622

(22) Filed: Dec. 18, 2012

(65) Prior Publication Data
US 2014/0173093 A1    Jun. 19, 2014

(51) Int. Cl.
*G06F 15/173*  (2006.01)
*H04L 29/12*  (2006.01)

(52) U.S. Cl.
CPC ........ *H04L 61/2015* (2013.01); *H04L 61/2038* (2013.01); *H04L 61/6022* (2013.01); *H04L 61/6077* (2013.01)

(58) Field of Classification Search
USPC ............................ 709/220, 221, 222, 223, 224
See application file for complete search history.

(56) References Cited

U.S. PATENT DOCUMENTS

| | | | |
|---|---|---|---|
| 6,988,163 B2* | 1/2006 | Malueg et al. | 711/103 |
| 7,480,710 B1* | 1/2009 | Olson et al. | 709/223 |
| 2006/0101194 A1 | 5/2006 | Malueg et al. | |
| 2007/0076475 A1 | 4/2007 | Malueg et al. | |
| 2007/0157051 A1* | 7/2007 | Hernandez et al. | 714/1 |
| 2008/0288684 A1* | 11/2008 | Ellison | 710/106 |
| 2010/0070705 A1* | 3/2010 | Samuelraj et al. | 711/114 |
| 2013/0232251 A1* | 9/2013 | Pauley | 709/224 |

* cited by examiner

*Primary Examiner* — Liangche A Wang
(74) *Attorney, Agent, or Firm* — Larson Newman, LLP

(57) ABSTRACT

A management controller includes a first data communication interface for communicating with a first network interface, a second data communication interface for communicating with a second network interface, and a processor. The first network interface provides a first network interface mode that permits a processing system to access a network, an operating system-to-management controller (OS-to-MC) pass-through mode that permits the management controller to access the processing system, and a network-to-management controller (Net-to-MC) pass-through mode that permits the management controller to access the network. The second network interface permits the management controller to access a management station. The management controller provides a common Media Access Control address and a common Internet Protocol address to the first data communication interface and to the second data communication interface without causing conflict on the network.

20 Claims, 5 Drawing Sheets

US 9,197,596 B2

SYSTEM AND METHOD TO USE COMMON ADDRESSES ON A MANAGEMENT CONTROLLER WITHOUT CONFLICT

FIELD OF THE DISCLOSURE

This disclosure generally relates to information handling systems, and more particularly relates to accessing a management controller using common addresses.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software resources that may be configured to process, store, and communicate information and may include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
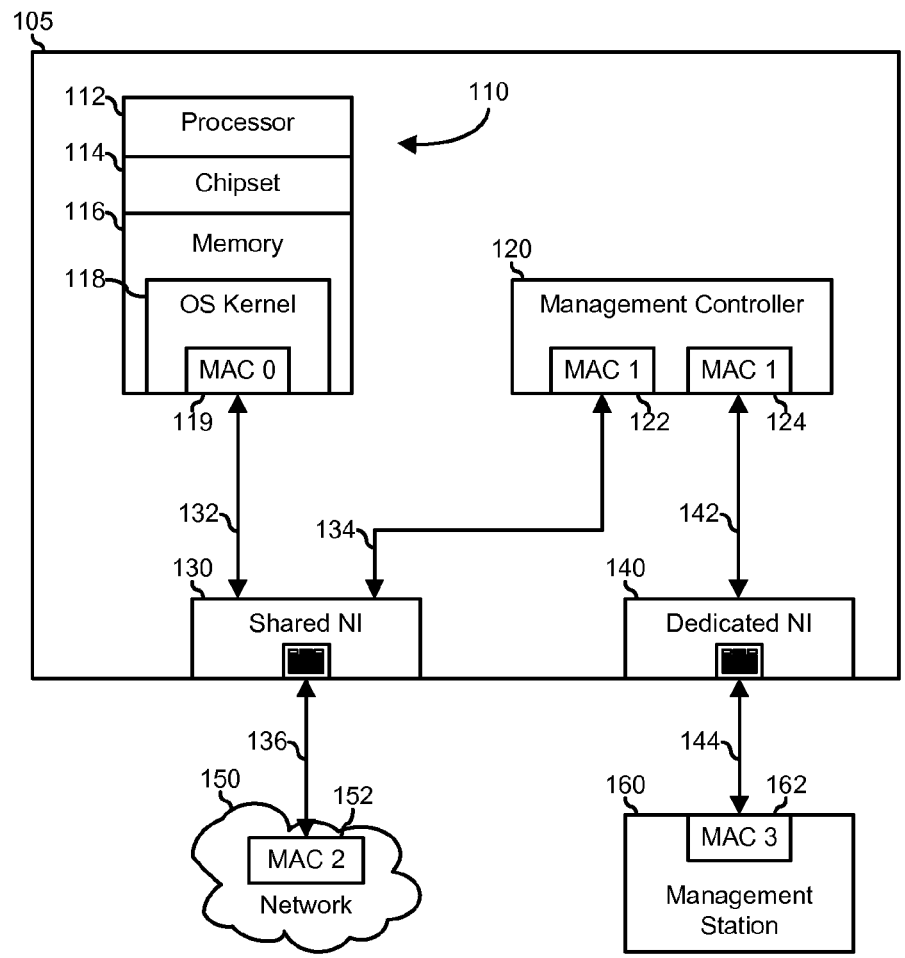
FIG. 1 is a block diagram illustrating a managed system according to an embodiment of the present disclosure.

FIG. 1 illustrates a managed network 100. For purpose of this disclosure a managed system can be implemented as an information handling system and may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic, and operates to execute code. Additional components of the information handling system may include one or more storage devices that can store code, one or more communications ports for communicating with external devices as well as various input and output (I/O) devices, such as a keyboard, a mouse, and a video display. The information handling system may also include one or more buses operable to transmit communications between the various hardware components.

Managed network 100 includes a managed system 105, a network 150, and a management station 160. Managed system 105 includes a processing stack 110, a management controller 120, a shared network interface 130, and a dedicated network interface 140. Processing stack 110 includes one or more processors 112, a chipset 114, and a memory 116. Processing stack 110 operates to provide one or more computing functions of managed system 105, such that the managed system operates as a standalone server system, a server system in a networked datacenter, a workstation, a client system, another information handling system, or a combination thereof. It will be understood by the skilled artisan that processing stack 110 represents an information handling system according to a particular system architecture, as needed or desired. For example, processing stack 110 can include an Intel Architecture such as an IA-32 or an IA-64 architecture, a Hypertransport architecture, another system architecture, or a combination thereof. Memory 116 represents one or more memory subsystems including random access memory (RAM) such as static RAM (SRAM), dynamic RAM (DRAM), non-volatile RAM (NV-RAM), or the like, read only memory (ROM), another type of memory, or a combination thereof. Memory 116 operates to store code and data that is executable to perform the various functions of managed system 105, and includes an operating system (OS) kernel 118. OS kernel 118 represents a post-boot operating environment for managed system 105, including a standalone OS environment, a virtualized OS environment, a client-server environment, a terminal-host environment, another operating environment, or a combination thereof.

Management controller 120 is a separate processing unit, such as a system-on-a-chip (SoC), for managing various features of managed system 105. For example, management controller 120 can monitor elements of managed system 105, such as processor temperature, cooling fan speed, power status, OS status, and the like. In a particular embodiment, management controller 120 is connected to management station 160, as described further below. Management controller 120 can provide status information to management station 160, such that an administrator at the management station can remotely access and manage the elements of managed system 105. For example, the administrator can detect a problem with managed system 105, such as an over-temperature condition, a power fluctuation, a hung operating system, and the like, and the administrator can take corrective action, such as changing an operating condition of the managed system, rebooting the managed system, or restarting the operating system. In a particular embodiment, management controller 120 represents a baseboard management controller (BMC) or an integrated Dell remote access controller (iDRAC), and operates in accordance with Intelligent Platform Management Interface (IPMI) specification.

Shared network interface 130 is a network interface device that includes two internal channels 132 and 134 and an external channel 136. Channel 132 is connected to processing stack 110, channel 134 is connected to management controller 120, and channel 136 is connected to network 150. In a particular embodiment, channel 132 represents a host interface such as a Peripheral Component Interface-Express (PCIe) channel, channel 134 represents a Reduced Media Independent Interface (RMII) that operates in accordance with a Network Controller Sideband Interface (NC-SI) protocol, and channel 136 represents a network channel such as an Ethernet channel, a Fibre Channel, an InfiniBand channel, a proprietary network channel, or a combination thereof. An example of shared network interface 130 includes a network interface device that is included on a baseboard or daughter board of managed system 105, such as a LAN-on-motherboard (LOM) device, a network interface card (NIC) that is plugged into a standard peripheral interface connector of the managed system, such as a PCIe socket, or another type of network interface device of the managed system, as needed or desired. Shared network interface 130 includes L2 and L3 data packet routing and filtering function that permit the shared network interface to receive data packets on one of channels 132, 134, or 136, to determine a destination address of the data packets, such as a destination MAC address or destination Internet Protocol (IP) address, and to forward the data packets to one or more of the channels based upon the destination address.

Dedicated network interface 140 is a network interface device that includes an internal channel 142 and an external channel 144. Channel 142 is connected to management controller 120 and channel 134 is connected to management station 160. In a particular embodiment, channel 142 represents a Reduced Gigabit Media Independent Interface (RGMII) and channel 144 represents a network channel such as an Ethernet channel, a Fibre Channel, an InfiniBand channel, a proprietary network channel, or a combination thereof. An example of dedicated network interface 140 includes a network interface device that is included on a baseboard or daughter board of managed system 105, such as a LAN-on-motherboard (LOM) device, a network interface card (NIC) that is plugged into a standard peripheral interface connector of the managed system, such as a PCIe socket, or another type of network interface device of the managed system, as needed or desired.

OS kernel 118 includes an identifier 119 to identify the OS kernel for the purposes of network communication. For example, identifier 119 represents a MAC address for identifying OS kernel 118 in the data link layer of the Open System Interconnection (OSI) model, such that the OS kernel can participate in OSI layer 2 (L2) network communications, an IP address for identifying OS kernel 118 in the network layer of the OSI model, such that the OS kernel can participate in OSI layer 3 (L3) network communications, or a combination thereof. Identifier 119 is shown as "MAC0." Management controller 120 includes identifiers 122 and 124 that represent MAC addresses, IP addresses, or a combination thereof. Identifiers 122 and 124 are shown as "MAC1," indicating that the identifiers represent a common MAC address, a common IP address, or a combination thereof. Network 150 represents a network of devices that each includes an identifier, shown collectively as an identifier 152, and that each represent a MAC address, an IP address, or a combination thereof. Identifier 152 for the devices is represented collectively as "MAC2." Management station 160 includes an identifier 162 that represents a MAC address, an IP address, or a combination thereof. Identifier 162 is shown as "MAC3."

Figure 2:
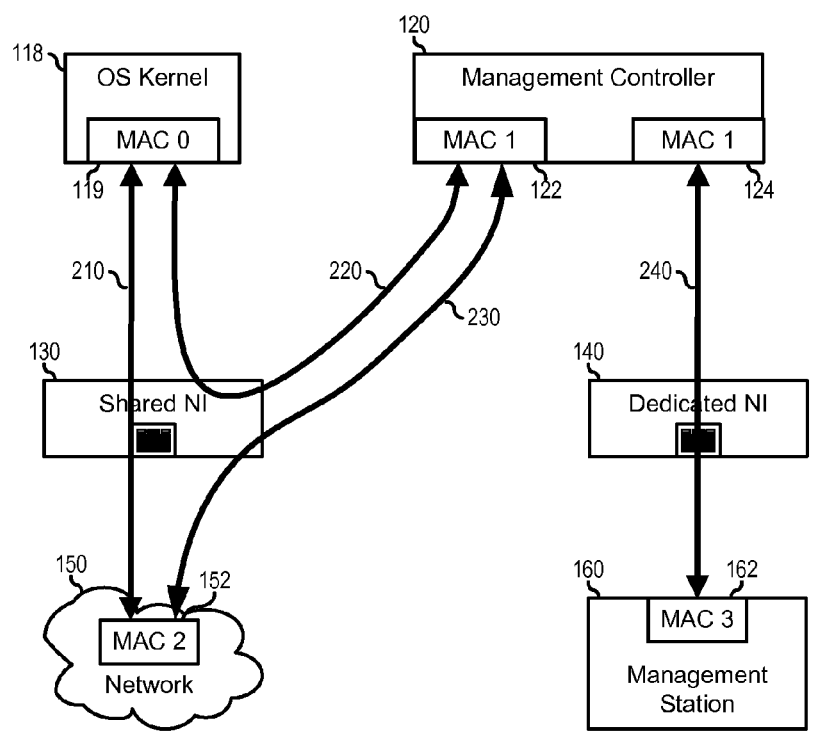
FIGS. 2 and 3 are block diagrams illustrating various embodiments of the managed system of FIG. 1.

FIG. 2 illustrates the operation of data packet routing in managed system 100, according to an embodiment of the present disclosure. Here, shared network interface 130 provides a typical network flow 210 between OS kernel 118 and network 150, such that data packets from OS kernel 118, that is, data packets that have MAC0 as the source address, and that are destined for network 150, that is, data packets that have MAC2 as the destination address, are routed by the shared network interface from channel 132 to channel 136, and data packets from network 150 that are destined for OS kernel 118 (i.e., data packets with MAC2 as the source address and with MAC0 as the destination address) are routed by the shared network interface from channel 136 to channel 132.

In addition to the typical network flow 210, shared network interface 130 provides an OS-to-Management Controller (OS-to-MC) pass-through flow 220, and a Network-to-Management Controller (Net-to-MC) pass-through flow 230. In OS-to-MC pass-through flow 220, data packets from OS kernel 118 that are destined for management controller 120 (i.e., data packets with MAC0 as the source address and with MAC1 as the destination address) are routed by shared network interface 130 from channel 132 to channel 134, without routing the data packets through an external network, such as network 150. Similarly, data packets from management controller 120 that are destined for OS kernel 118 (i.e., data packets with MAC1 as the source address and with MAC0 as the destination address) are routed by shared network interface 130 from channel 134 to channel 132, without having to be routed through the external network.

In Net-to-MC pass-through flow 230, data packets from network 150 that are destined for management controller 120 (i.e., data packets with MAC2 as the source address and with MAC1 as the destination address) are routed by shared network interface 130 from channel 136 to channel 134, and data packets from management controller 120 that are destined for network 150 (i.e., data packets with MAC1 as the source address and with MAC2 as the destination address) are routed by the shared network interface from channel 134 to channel 136. Dedicated network interface 120 provides a typical network flow 240 between management controller 120 and management station 160, such that data packets from the management controller that are destined for management station 160 (i.e., data packets with MAC1 as the source address and with MAC3 as the destination address) are routed from channel 142 to channel 144, and data packets from the management station that are destined for the management controller (i.e., data packets with MAC3 as the source address and with MAC1 as the destination address) are routed from channel 144 to channel 142. Table 1, below, illustrates the data packet routing options within managed system 100, as shown in the embodiment of FIG. 2.

TABLE 1

Data Package Routing Options with Net-to-MC pass-through Enabled

| Destination | Source | | | |
|---|---|---|---|---|
| | MAC 0 | MAC 1 | MAC 2 | MAC 3 |
| MAC 0 |  | OS-to-MC PT | Shared NIC | No Route |
| MAC 1 | OS-to-MC PT |  | Net-to-MC PT | Dedicated NIC |
| MAC 2 | Shared NIC | Net-to-MC PT |  | No Route |
| MAC 3 | No Route | Dedicated NIC | No Route |  |

In a particular embodiment, OS-to-MC pass-through flow 220 permits an administrator logged in to managed system 105 to open a web browser session to interface with management controller 120. For example, a web browser can call a Web Services Management (WSMan) suit to access a Common Information Model Object Manager (CIMON) in management controller 120 to provide status information for managed system 105 to the administrator and to permit the administrator to detect a problem and take corrective action. Also, certain tasks within OS kernel 118, such as system power management or processor temperature management, can access management controller 120 via OS-to-MC pass-through flow 220 to receive information needed to perform the tasks.

Figure 3:
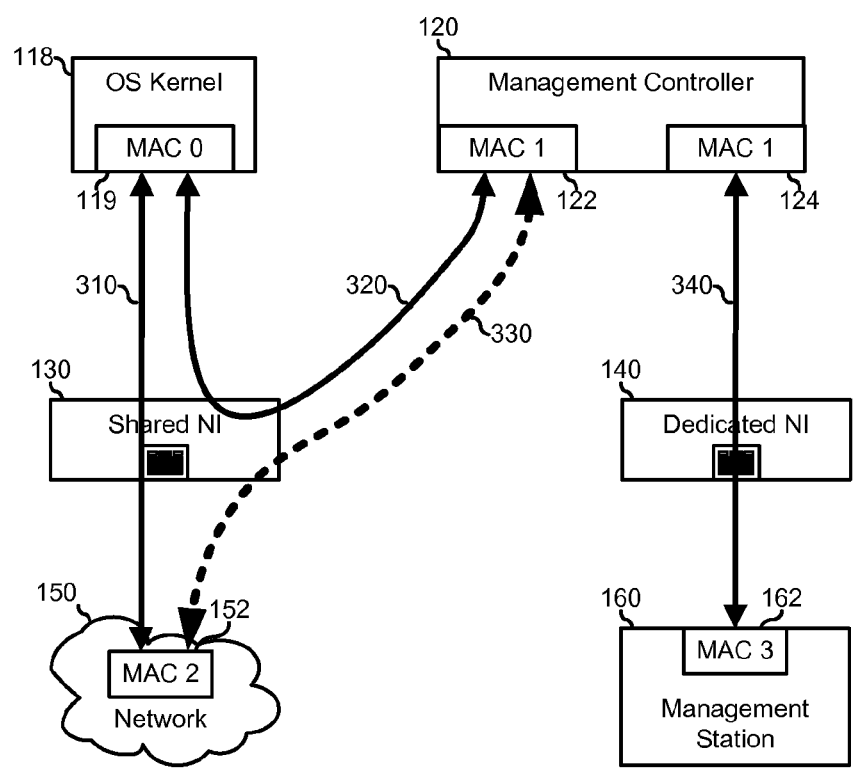

Note that in the illustrated embodiment, MAC1 can be reached via both Net-to-MC pass-through flow 230 and network flow 240. As such, if management station 160 is not isolated from network 150, such as by placing the management station on a separate management network, then the routers and switches that interconnect the network and the management station can experience routing table contention. FIG. 3 illustrates the operation of data packet routing in managed system 100, according to an embodiment of the present disclosure, where network 150 and management station 160 do not need to be isolated from each other. Here, shared network interface 130 provides a typical network flow 310 between OS kernel 118 and network 150 and dedicated network interface 140 provides a typical network flow 340 between management controller 120 and management station 160. Here, in addition to the typical network flow 310, shared network interface 130 provides an OS-to-MC pass-through flow 320, but a Net-to-MC pass-through flow 330 is disabled. Table 3, below, illustrates the data packet routing options within managed system 100, as shown in the embodiment of FIG. 3.

Figure 4:
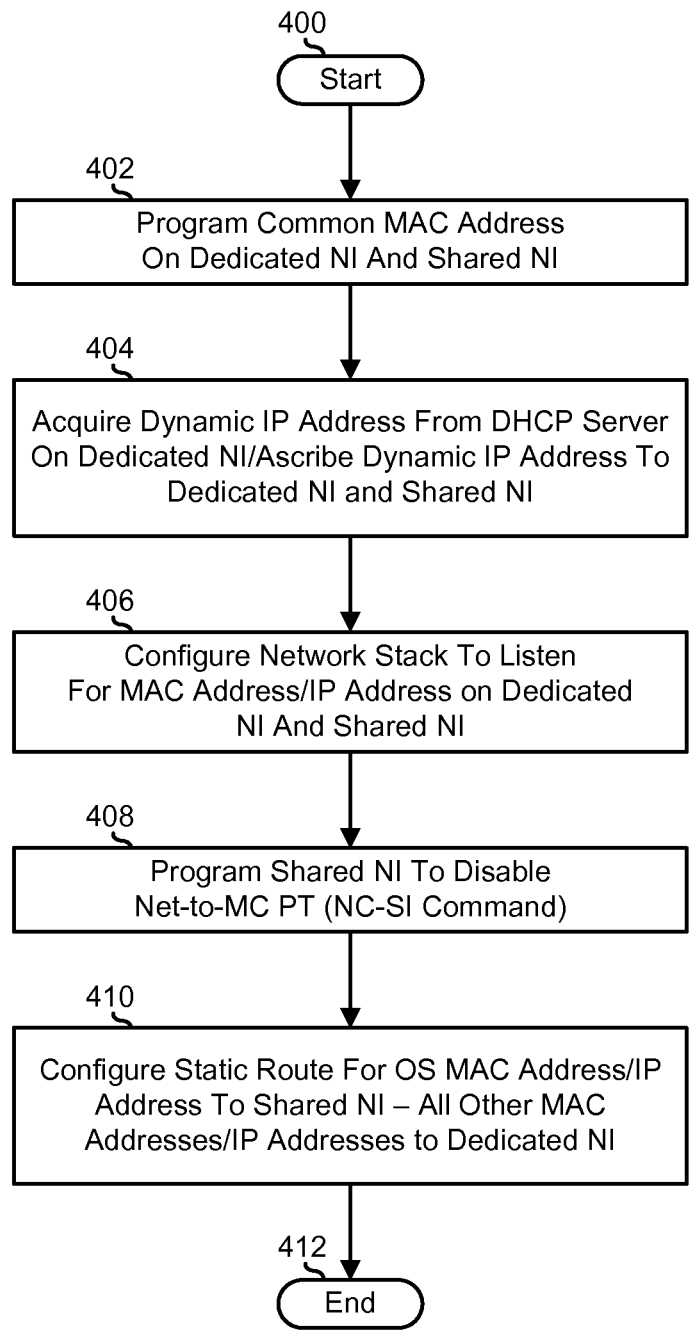
FIG. 4 is a flow chart illustrating a method of configuring a management controller with common Media Access Control (MAC) addresses and common Internet Protocol addresses.

FIG. 4 illustrates a method of configuring a management controller with common MAC addresses and common IP addresses, starting at block 400. A management controller is programmed with a common MAC address on both of a channel connected to a dedicated network interface and a channel connected to a shared network interface in block 402. For example, management controller 120 can provide a particular MAC address for identifier 122 that is connected to channel 134, and for identifier 124 that is connected to channel 142. In a particular embodiment, the management controller can be factory configured such the identifiers for both channels are programmed to have the common MAC address. In another embodiment, the management controller can be configured by an administrator to have the common MAC address. The management controller acquires a dynamic IP address from a Dynamic Host Configuration Protocol (DHCP) server that is connected to the dedicated network interface, and the dynamic IP address is ascribed to both channels in block 404. Here, management station 160 can include a DHCP server function, and management controller 120 can acquire the dynamic IP address from the management station. In another embodiment, instead of acquiring a dynamic IP address from a DHCP server, the management controller can be configured with a static IP address that is associated with both of the channels.

A network stack in the management controller is configured to listen for the common MAC address and the common IP address on both the channel connected to the dedicated network interface and the channel connected to the shared network interface in block 406. For example, management controller 120 can be configured to listen on both channels 134 and 142 to listen for the MAC address and IP address associated with identifiers 122 and 124 (i.e., MAC0). The management controller programs the shared network interface to disable Net-to-MC pass-through in block 408. For example, a management controller can send an NC-SI command to the shared network interface to disable the Net-to-MC pass-through mode. The network stack in the management controller is configured to include a static route to the

TABLE 2

Data Package Routing Options with Net-to-MC pass-through Enabled

| Destination | Source | | | |
|---|---|---|---|---|
| | MAC 0 | MAC 1 | MAC 2 | MAC 3 |
| MAC 0 |  | OS-to-MC PT | Shared NIC | No Route |
| MAC 1 | OS-to-MC PT |  | Net-to-MC PT | Dedicated NIC |
| MAC 2 | Shared NIC | Net-to-MC PT |  | No Route |
| MAC 3 | No Route | Dedicated NIC | No Route |  | shared network interface for IP addresses that are associated with a system OS in block 410. For example, management controller 120 can be configured such that any data packets originating in management controller 120 and that are destined to OS kernel 118 are routed via channel 134 to shared network interface 130 such that the OS-to-MC flow 310 is utilized to get the data packets to the OS kernel. Block 410 also includes configuring the network stack in the management controller to route all other MAC addresses and IP addresses to the dedicated network interface. The method ends in block 412.

Figure 5:
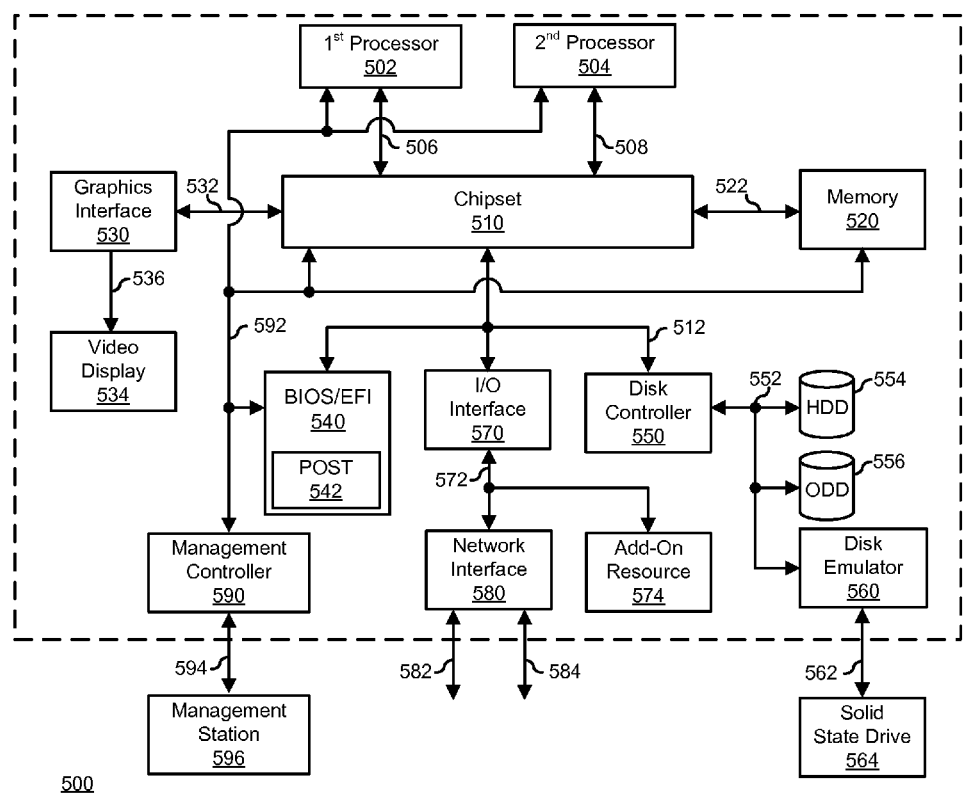
FIG. 5 is a block diagram illustrating an information handling system according to an embodiment of the present disclosure.

FIG. 5 illustrates an information handling system 500 including a processor 502 and one or more additional processors 504, a chipset 510, a memory 520, a graphics interface 530, include a basic input and output system/extensible firmware interface (BIOS/EFI) module 540, a disk controller 550, a disk emulator 560, an input/output (I/O) interface 570, a network interface 580, and a management controller (MC) 590. Processor 502 is connected to chipset 510 via processor interface 506, and processor 504 is connected to the chipset via processor interface 508. Memory 520 is connected to chipset 510 via a memory bus 522. Graphics interface 530 is connected to chipset 510 via a graphics interface 532, and provides a video display output 536 to a video display 534. In a particular embodiment, information handling system 500 includes separate memories that are dedicated to each of processors 502 and 504 via separate memory interfaces. An example of memory 520 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 540, disk controller 550, and I/O interface 570 are connected to chipset 510 via an I/O channel 512. An example of I/O channel 512 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 510 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 540 includes BIOS/EFI code operable to detect resources within information handling system 500, to provide drivers for the resources, initialize the resources, and access the resources. BIOS/EFI module 540 includes code that operates to detect resources within information handling system 500, to provide drivers for the resources, to initialize the resources, and to access the resources.

Disk controller 550 includes a disk interface 552 that connects the disc controller to a hard disk drive (HDD) 554, to an optical disk drive (ODD) 556, and to disk emulator 560. An example of disk interface 552 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 560 permits a solid-state drive 564 to be coupled to information handling system 500 via an external interface 562. An example of external interface 562 includes a USB interface, an IEEE 1394 (Firewire) interface, a proprietary interface, or a combination thereof. Alternatively, solid-state drive 564 can be disposed within information handling system 500.

I/O interface 570 includes a peripheral interface 572 that connects the I/O interface to an add-on resource 574 and to network interface 580. Peripheral interface 572 can be the same type of interface as I/O channel 512, or can be a different type of interface. As such, I/O interface 570 extends the capacity of I/O channel 512 when peripheral interface 572 and the I/O channel are of the same type, and the I/O interface translates information from a format suitable to the I/O channel to a format suitable to the peripheral channel 572 when they are of a different type. Add-on resource 574 can include a data storage system, an additional graphics interface, a network interface card (NIC), a sound/video processing card, another add-on resource, or a combination thereof. Add-on resource 574 can be on a main circuit board, on separate circuit board or add-in card disposed within information handling system 500, a device that is external to the information handling system, or a combination thereof.

In a particular embodiment, add-on resource 574 includes an option ROM (not illustrated). The option ROM is a firmware component supplied by the maker of add-on resource 574 and that operates to initialize and configure the add-on resource 574 during boot of information handling system 500. The option ROM extends the functionality of BIOS/EFI module 540 to incorporate the functionality of add-on resource 574 into information handling system 500. As such, the option ROM provides an interface between BIOS/EFI module 540 and add-on resource 574, permitting the BIOS/EFI module to implement functions specific to the add-on resource 574, such as power-on self test, interrupt service, or input/output service calls. The option ROM may be in memory 520, or in a memory of add-on resource 574.

Network interface 580 represents a NIC disposed within information handling system 500, on a main circuit board of the information handling system, integrated onto another component such as chipset 510, in another suitable location, or a combination thereof. Network interface device 580 includes network channels 582 and 584 that provide interfaces to devices that are external to information handling system 500. In a particular embodiment, network channels 582 and 584 are of a different type than peripheral channel 572 and network interface 580 translates information from a format suitable to the peripheral channel to a format suitable to external devices. An example of network channels 582 and 584 includes InfiniBand channels, Fibre Channel channels, Gigabit Ethernet channels, proprietary channel architectures, or a combination thereof. Network channels 582 and 584 can be coupled to external network resources (not illustrated). The network resource can include another information handling system, a data storage system, another network, a grid management system, another suitable resource, or a combination thereof.

MC 590 is connected to processors 502 and 504, chipset 510, memory 520, and BIOS/EFI module 540 via a system communication bus 592. MC 590 may be on a main circuit board (such as a baseboard, a motherboard, or a combination thereof), integrated onto another component such as chipset 510, in another suitable location, or a combination thereof. In a particular embodiment, one or more additional resources of information handling system 500, such as graphics interface 530, video display 534, I/O interface 570, disk controller 550, and network interface 580 are connected to MC 590. MC 590 can be part of an integrated circuit or a chip set within information handling system 500, and can be on a main circuit board, on separate circuit board or add-in card disposed within the information handling system, or a combination thereof. An example of MC 590 includes a baseboard management controller (BMC), an integrated Dell remote access controller (iDRAC), another controller, or a combination thereof. An example of system communication bus 592 includes an inter-integrated circuit (I²C) bus, a system management bus (SMBus), a serial peripheral interface (SPI) bus, a low pin count (LPC) bus, another bus, or a combination thereof.

MC 590 is connected via a network channel 594 to a management station 596 that is external to information handling system 500. Management station 596 operates in conjunction with management controller 590 to provide out-of-band management of information handling system 500. Commands, communications, or other signals are communicated between MC 590 and management station 596 to monitor status of information handling system 500, to control the operations of the resources of the information handling system, and to update the resources. In a particular embodiment, MC 590 is powered by a separate power plane in information handling system 500, so that the MC can be operated while other portions of the information handling system are powered off. In another embodiment, MC 590 is operated during boot of information handling system 500).

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A management controller comprising:
    a first data communication interface for communicating with a first network interface, the first network interface being configured to provide:
        a first network interface mode that permits a processing system to access a network;
        an operating system-to-management controller (OS-to-MC) pass-through mode that permits the management controller to access the processing system; and
        a network-to-management controller (Net-to-MC) pass-through mode that permits the management controller to access the network;
    a second data communication interface for communicating with a second network interface, the second network interface being configured to permit the management controller to access a management station; and
    a processor operable to provide a common Media Access Control (MAC) address to the first data communication interface and to the second data communication interface.

2. The management controller of claim 1, wherein the processor is further operable to direct the first network interface to disable the Net-to-MC pass-through mode.

3. The management controller of claim 2, wherein, in directing the first network interface to disable the Net-to-MC pass-through mode, the processor is further operable to provide a Network Controller Sideband Interface command to the first network interface.

4. The management controller of claim 1, wherein the processor is further operable to provide a common Internet Protocol (IP) address to the first data communication interface and to the second data communication interface.

5. The management controller of claim 4, wherein the common IP address is obtained from a Dynamic Host Configuration Protocol server via the second network interface.

6. The management controller of claim 1, wherein:
    the first data communication interface comprises a Reduced Media Independent Interface; and
    the second data communication interface comprises a Reduced Gigabit Media Independent Interface.

7. The management controller of claim 1, further comprising:
    a network stack;
    wherein the processor is further operable to configure the network stack to listen for network traffic associated with the common MAC address on the first data communication interface and the second data communication interface.

8. The management controller of claim 1, wherein the processor is further operable to configure a static route for a first MAC address associated with the processing system, the static route being operable to direct a data packet destined for the first MAC address to the first data communication interface.

9. The management controller of claim 8, wherein the processor is further operable to configure a dynamic route for a second MAC address, the dynamic route being operable to direct a data packet destined for the second MAC address to the second data communication interface.

10. The management controller of claim 1, wherein the management controller comprises a baseboard management controller.

11. An information handling system comprising:
    a processing stack;
    a management controller;
    a first network interface coupled to the processing stack via a first channel, and to the management controller via a second channel, wherein the first network interface is configured to provide:
        a first network mode that permits the processing stack to access a network;
        an operating system-to-management controller (OS-to-MC) pass-through mode that permits the management controller to access the processing stack; and
        a network-to-management controller (Net-to-MC) pass-through mode that permits the management controller to access the network; and
    a second network interface coupled to the management controller via a third channel;
    wherein the management controller is operable to:
        associate a common Media Access Control (MAC) address with the second channel and the third channel; and
        direct the first network interface to disable the Net-to-MC pass-through mode.

12. The information handling system of claim 11, wherein the management controller is further operable to:
    obtain a common Internet Protocol (IP) address from a Dynamic Host Configuration Protocol server via the second network interface; and associate the common IP address with the second channel and the third channel.

13. The information handling system of claim 11, wherein:
the first channel comprises a Peripheral Component Interconnect-Express channel;
the second channel comprises a Reduced Media Independent Interface; and
the third channel comprises a Reduced Gigabit Media Independent Interface.

14. The information handling system of claim 11, wherein the management controller is further operable to configure a network stack to listen for network traffic associated with the common MAC address on the second channel and the third channel.

15. The information handling system of claim 11, wherein the management controller is further operable to:
configure a static route for a first Internet Protocol (IP) address associated with the processing stack, the static route being operable to direct a data packet destined for the first IP address to the processing stack via the second channel; and
configure a dynamic rout for a second IP address, the dynamic route being operable to direct a data packet destined for the second IP address to the third channel.

16. The information handling system of claim 11, wherein the management controller comprises an Integrated Dell Remote Access Controller.

17. A method comprising:
providing, on a first channel of a management controller, an operating system-to-management controller (OS-to-MC) pass-through mode that permits the management controller to access a processing system, and a network-to-management controller (Net-to-MC) pass-through mode that permits the management controller to access a network;
providing a second channel of the management controller that permits the management controller to access a management station;
configuring the management controller to ascribe a common Media Access Control (MAC) address to the first channel and to the second channel; and
sending, via the first channel, a command to a shared network interface device coupled to the first channel, the command to disable a network-to-management controller (Net-to-MC) pass-through mode on the shared network interface device.

18. The method of claim 17, further comprising:
receiving, via the second channel, a common Internet Protocol (IP) address; and
configuring the management controller to ascribe the common IP address to the first channel and to the second channel.

19. The method of claim 18, further comprising:
configuring a network stack of the management controller to listen for network traffic associated with the common MAC address and with the common IP address on the first channel and the second channel.

20. The method of claim 17, further comprising:
configuring a static route for a first Internet Protocol (IP) address associated with a processing stack coupled to the shared network interface, the static route being operable to direct a data packet destined for the first IP address to the processing stack via the first channel; and
configuring a dynamic route for a second IP address, the dynamic route being operable to direct a data packet destined for the second IP address to the second channel.

* * * * *